United States Patent [19]

Dages

[11] 4,390,594

[45] Jun. 28, 1983

[54] PLASTICIZERS FOR POLYVINYL BUTYRAL

[75] Inventor: Daniel Dages, Les Mureaux, France

[73] Assignee: Saint Gobain Vitrage, Neuilly-sur-Seine, France

[21] Appl. No.: 326,230

[22] Filed: Dec. 1, 1981

[30] Foreign Application Priority Data

Dec. 2, 1980 [FR] France ............................ 80 25535

[51] Int. Cl.³ ...................... C08F 45/38; B32B 17/10; B32B 27/42
[52] U.S. Cl. .................................. 428/437; 524/287; 524/308; 525/61; 526/315; 428/411; 428/524
[58] Field of Search .................. 428/437, 411, 524; 524/287, 308; 525/61; 526/315

[56] References Cited

U.S. PATENT DOCUMENTS

| | | | |
|---|---|---|---|
| T789,055 | 6/1949 | Stamatoff | 428/437 |
| 4,144,217 | 3/1979 | Snelgrove | 428/437 |
| 4,230,771 | 10/1980 | Phillips | 428/437 |
| 4,243,572 | 1/1981 | Dages | 428/437 |
| 4,276,351 | 6/1981 | Phillips | 428/437 |

FOREIGN PATENT DOCUMENTS

| | | |
|---|---|---|
| 847504 | 10/1939 | France . |
| 523773 | 7/1940 | United Kingdom . |

*Primary Examiner*—Ellis P. Robinson
*Attorney, Agent, or Firm*—Pennie & Edmonds

[57] ABSTRACT

This invention relates to a novel group of plasticizers for polyvinyl butyral wherein the plasticizer comprises a mixture of at least one triethylene glycol diester of a monocarboxylic acid having a carbon chain comprising 7 or 8 carbon atoms and at least one dialkyl adipate in which the alkyl group contains from 3 to 8 carbon atoms or at least one alkyl alkylaryl adipate.

20 Claims, No Drawings

PLASTICIZERS FOR POLYVINYL BUTYRAL

TECHNICAL FIELD

This invention relates to a novel group of plasticizers for polyvinyl butyral wherein the plasticizer comprises a mixture of at least one triethylene glycol diester of a monocarboxylic acid having a carbon chain comprising 7 or 8 carbon atoms and at least one adipate chosen from the group consisting of the subgroups comprising (i) dialkyl adipates in which the alkyl group contains from 3 to 8 carbon atoms and (ii) alkyl alkylaryl adipates.

BACKGROUND ART

Plasticized polyvinyl butyral is widely used as an interlayer or insert in the laminated safety glass used particularly in automobiles or building constructions. The laminated safety glass used for these purposes should exhibit certain properties such as good edge stability, heat resistance and shock resistance, particularly at low ambient temperatures. The plasticized polyvinyl butryal interlayer determines the degree to which these desired properties are exhibited by the laminated safety glass.

The edge stability, or resistance to delamination of the laminated safety glass, is directly linked to the compatibility of the plasticizer with the polyvinyl butyral resin (PVB). The most typical incompatibility of the plasticizer and the PVB resin results in the exudation of the plasticizer from the plasticized polyvinyl butyral sheet and subsequent delamination of the laminated glass.

The use of mixed alkyl alkylaryl adipates as PVB plasticizers is known in the prior art, European Pat. No. 0011577. These adipates are generally represented by the following structural formula:

wherein n is greater than or equal to 1 and the sum of p+r is greater than or equal to 1.

Suitable mixed adipates of this formula are, for example, benzyl octyl adipate, benzyl hexyl adipate, benzyl butyl adipate and benzyl decyl adipate.

The mixed adipates are useful as plasticizers for PVB resins having a molecular weight of 30,000 to 600,000, comprising 0 to 10% by weight of residual ester groups, calculated as polyvinyl acetate and 12 to 25% by weight of hydroxyl groups, calculated as polyvinyl alcohol. Mixed adipates of this type have a good compatibility with the PVB resin. Thus, laminated glasses containing these plasticized polyvinyl interlayers exhibit good mechanical properties and have excellent edge stability and good heat resistance. For certain uses, however, these mixed adipate plasticized polyvinyl butyral interlayers fail to provide the laminated safety glass with adequate cold resistance and particularly shock resistance in the cold.

The use of dialkyl adipates, such as dibutyl adipate, di-n-pentyl adipate, di-n-hexyl adipate, di-n-heptyl adipate and di-n-octyl adipate as PVB plasticizers is also known. However, these plasticizers exhibit only a partial compatibility with the PVB resin that decreases as the molecular weight of the adipate and/or the hydroxyl group content of the PVB resin increases. This necessitates either the use of resins having a low hydroxyl group content, and consequently, less adherence, or low molecular weight dialkyl adipates. Under these circumstances, the heat resistance and/or the edge stability of the laminated glass containing these plasticizers is unsatisfactory.

The use of certain carboxylic esters of glycol as PVB plasticizers is known from U.S. Pat. No. 2,229,222. According to that reference, the carbon chain of the acid contains no more than 6 carbon atoms and the plasticizers include: diethylene glycol di-2-ethylbutyrate, triethylene glycol di-2-ethylbutyrate, tetraethylene glycol di-2-ethylbutyrate, diethylene glycol di-n-hexoate, triethylene glycol di-n-hexoate, triethylene glycol di-2-methyl pentoate and pentaethylene glycol di-2-ethylbutyrate. These plasticizers are generally quite compatible with PVB and the plasticized PVB product frequently demonstrates good cold resistance. However, the compounds are costly, and when used in the amounts called for—on the order of 30% by weight in proportion to the PVB resin—lead to an expensive plasticized product.

Although it is known, according to U.S. Pat. No. 4,230,771 to use tetraethylene glycol di-n-heptanoate as a plasticizer for PVB, the other diesters derived from acids having a carbon chain of 7 or more carbon atoms are generally slightly or not at all compatible with PVB.

GENERAL DESCRIPTION OF THE INVENTION

This invention is aimed at eliminating the limitations imposed by the use of the plasticizers of the prior art. According to an advantageous embodiment of the invention, a plasticizer for PVB is formed by a mixture of at least one triethylene glycol diester of a monocarboxylic acid having a carbon chain comprising 7 or 8 carbon atoms and at least one adipate chosen from the group consisting of the subgroups comprising (i) dialkyl adipates in which the alkyl group comprises from 3 to 8 carbon atoms and (ii) mixed alkyl alkylaryl adipates of the general formula:

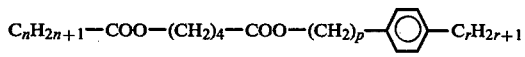

wherein n is greater than or equal to 1 and the sum of p+r is greater than or equal to 1.

The plasticizer mixture of this invention permits the formation of a plasticized PVB which, when used as an interlayer in the laminated glass, improves the cold resistance and particularly the cold resilience of the glass. Values for n, p and r are chosen so that the advantageous plasticizer of this invention retains its properties of excellent compatibility with the PVB resin and increased stability of the plasticized product, particularly at low temperatures. This plasticizer mixture is available at an economical price and is particularly compatible with PVB resins. Advantageously, PVB resins plasticized according to this invention can contain elevated proportions of hydroxyl groups.

DESCRIPTION OF THE PREFERRED EMBODIMENTS

The mixed alkyl alkylaryl adipate component of the plasticizers used in this invention is represented by the structural formula:

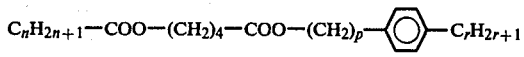

wherein n is greater than or equal to 1 and the sum of p+r is greater than or equal to 1. Particularly suitable mixed adipates of the above formula are benzyl octyl adipate, benzyl hexyl adipate, benzyl butyl adipate and benzyl decyl adipate.

Preferred triethylene glycol diesters of monocarboxylic acid include triethylene glycol di-n-heptanoate, triethylene glycol di-2-ethylhexanoate and triethylene glycol di-n-octanoate.

The addition of the mixed alkyl alkylaryl adipates permits reduction of the cost of the plasticizer without a corresponding diminution of the mechanical properties of the plasticized interlayer.

Under one advantageous embodiment of the invention, a plasticized polyvinyl butyral is prepared by means of a mixture of plasticizers comprising from approximately 10 to 90% of a triethylene glycol diester of a monocarboxylic acid, with the remainder made up from at least one mixed alkyl alkylaryl adipate, or at least one dialkyl adipate.

Polyvinyl butyral resins that can be plasticized according to this invention have a molecular weight of 30,000 to 600,000, a 0 to 10% content by weight of residual ester groups, calculated as polyvinyl acetate and a 12 to 25% content by weight of hydroxyl groups, calculated as polyvinyl alcohol. Preferably, the residual ester group content of the PVB resin is less than 5%, and the PVB resin is prepared according to the method described in French Pat. No. 2,401,941, the disclosure of which is hereby incorporated by reference.

The test methods used to demonstrate the advantages of the present invention are described below.

The PVB resins used in the tests were prepared according to the method of French Pat. No. 2,401,941.

Plasticized polyvinyl butryal was obtained by mixing PVB resin with the plasticizer of this invention. Although the quantity of plasticizer used can vary as a function of the plasticized PVB properties that are desired, the plasticizer content of the PVB-plasticizer is preferably between about 10 and 65%.

The plasticizing of the PVB resin may be carried out by any standard method known in the art. For example, the PVB resin may be placed in a mixer and a determined quantity of the plasticizer added gradually, under agitation. The mixing process can be performed at ordinary temperatures for about 30 minutes, or at higher temperatures.

Alternatively, the plasticizing method described in French Pat. No. 2,235,163 may be used. The mixers described in an article, "Préparation des mélanges," published in the journal "Les Techniques de l'Ingénieur" (reference J. 1930, pgs 1-6, May 1965) may also be used in the mixing process. In the tests and the following examples, after mixing the PVB resin with the plasticizer, the plasticized PVB obtained was extruded to form sheets having a thickness of 0.76 mm. These sheets are advantageously used as insert layers in laminated glass.

In all of the tests, laminated glass samples were prepared in the following manner. A 0.76 mm thick sheet of plasticized polyvinyl butyral was preconditioned in a moist environment and then placed between two square plate glass sheets measuring 30.5×30.5 cm and having a thickness of 3 mm. The samples were subsequently compressed in an autoclave for 20 minutes at a temperature of 138° C. and a pressure of 10 bars. The glass samples were then divided into three groups and each group was conditioned for 24 hours at a pre-determined temperature of −20° C., −10° C. or 20° C.

RESISTANCE TO SHOCKS AT DIFFERENT TEMPERATURES

In the first test of resistance to shocks, a 2.260 kg steel ball was dropped onto the center of a laminated glass sample resting on a wooden frame. The laminated glass samples contained various PVB plasticizers, including those of this invention.

The test was carried out at +20° C. and −10° C. and the approximate height at which 90% of the laminated glass samples withstood the impact of the ball drop without being penetrated was determined. The results of this test are recorded in Table I.

In the second cold shock resistance test, a 0.227 kg steel ball having a diameter of 38 mm was dropped a distance of 10 m onto the center of a laminated glass sample resting on a wooden frame. The test was run at −20° C.

The samples were subsequently examined to determine (1) whether or not the projectile penetrated the glass; (2) the mass of glass detached by the impact; (3) whether tears or cracks were produced in the plasticized PVB interlayer after the impact.

The test results were considered to be good if the mass of the glass detached after impact was less than 25 g, or if the ball did not penetrate the laminated glass. The presence of a crack in the sample indicated a lower level of resistance to shock in the cold. The results of this test appear in Table I.

HEAT RESISTANCE

In the boiling water test, laminated glass samples, some of which comprised the plasticized PVB of this invention, were placed in boiling water for 2 hours. The samples were then examined and the presence or absence of bubble formation within the laminated glass was recorded. Bubble-free samples were again placed in boiling water for 4 more hours, after which they were again examined. The results of this test appear in Table I.

EXAMPLES

The following examples illustrate the good edge stability, heat resistance and shock resistance at various temperatures exhibited by a laminated glass containing polyvinyl butyral sheets plasticized with the plasticizer mixture disclosed by this invention.

These examples are non-limiting in scope and are presented to illustrate the advantages of the invention utilizing a mixture of triethylene glycol di-n-heptanoate or triethylene glycol di-2-ethylhexanoate with an alkyl alkylaryl adipate as a plasticizing agent for PVB resins.

The following list indicates the significance of the abbreviations used in the examples:

| | |
|---|---|
| 3 GOE | triethylene glycol di-n-heptanoate |
| BOA | benzyl octyl adipate |
| n.DHA | di-n-hexyl adipate |
| 3GH | triethylene glycol di-2-ethylbutyrate |
| 3GO | triethylene glycol | di-2-ethylhexanoate

EXAMPLES 1 to 4

Examples 1 to 4 in Table I illustrate the good properties demonstrated by laminated glass containing PVB interlayers that have been plasticized with a mixture of adipates according to the invention.

EXAMPLES 5 to 8

Examples 5 to 8 in Table I, used for comparison, are control samples representing laminated glasses comprising an interlayer plasticized by means of conventional plasticizers.

TABLE I

| Ex. | Nature of Plasticizers (1) | (2) | Ratio Between Plasticizers (%) (1/2) | Total Plasticizers as % of Resin (p.o.r.) | Proportion of OH Groups in the Resin (%) | Test of 2.260 kg Ball Drop (in feet) −10 | +20° C. | Test of 0.227 kg Ball Drop <20° C. | Boiling Water Test | Compatibility |
|---|---|---|---|---|---|---|---|---|---|---|
| 1 | 3GOE | BOA | 20/80 | 40 | 18.5 | 11 | 20 | 6/6 | Good | Yes |
| 2 | 3GOE | BOA | 50/50 | 38 | 18.5 | 14 | 22 | 6/6 | Good | Yes |
| 3 | 3GOE | BOA | 75/25 | 38 | 18.5 | 17 | 20 | 6/6 | Good | Yes |
| 4 | 3GO | BOA | 40/60 | 37 | 19.5 | 13 | 22 | 6/6 | Good | Yes |
| 5 | — | BOA | — | 37 | 18.5 | 9 | 24 | 5/6 | Good | Yes |
| 6 | — | nDHA | — | 37 | 18.5 | 8 | 25 | 5/6 | Good | Yes |
| 7 | — | 3 GH | — | 41 | 20 | 9 | 22 | 6/6 | Good | Yes |
| 8 | 3GOE | — | — | 38 | 18.5 | 20 | 21 | 6/6 | Good | Yes |

Column 1 of the table indicates the example number. The second and third columns indicate the nature of the plasticizers added to the PVB resin and the 4th column, where necessary, lists the ratio of these plasticizers in the sample mixture. Column 5 indicates the total plasticizer content, expressed as a percentage of the PVB resin (abbreviated p.c.r.). Column 6 indicates the OH content of the particular PVB resin. Columns 7 and 8 record the results of the 2.260 kg ball drop tests conducted at −10° C. (column 7) and at +20° C. (column 8). The results, expressed in feet, represent the approximate height at which 90% of the test samples withstood the impact of the ball drop. Column 9 reflects the results of the 0.227 kg ball drop test carried out at −20° C. The results indicate the number of test samples withstanding the impact. Column 10 lists the results of the boiling water test and column 11 indicates the compatibility of the particular plasticizer mixture with the PVB resin.

Table I demonstrates the improved qualities of laminated glasses having an interlayer plasticized with the unique plasticizer mixture of this invention. For example, a mixture of triethylene glycol di-n-heptanoate with an alkyl alkylaryl adipate provides a laminate that demonstrates good resistance to shocks at normal temperatures, as well as at lower temperatures. This level of shock resistance is greater than that obtained when conventional plasticizers are employed.

All of the tests carried out with the small 0.227 kg ball are positive when the laminated glass contains an interlayer plasticized according to this invention, in contrast to some control samples that are penetrated by the projectile. Moreover after impact the interlayer does not exhibit cracking or tearing, in contrast to various control samples.

Table I also demonstrates that, for example, the mixture of triethylene glycol di-n-heptanoate with an alkyl alkylaryl adipate is very compatible with PVB resins, even when the relative proportion of hydroxyl groups in the resin is elevated.

I claim:

1. A plasticizer for polyvinyl butyral having a molecular weight between about 30,000 and 600,000, a 0 to 10% content by weight of residual ester groups, calculated as polyvinyl acetate and a 12 to 25% content by weight of hydroxyl groups, calculated as polyvinyl alcohol wherein the plasticizer comprises a mixture of:
   (a) between about 10 and 90% of at least one triethylene glycol diester of a monocarboxylic acid wherein the carbon chain comprises 7 or 8 carbon atoms; and
   (b) between about 90 and 10% of at least one adipate which is:
      (i) an alkyl alkylaryl adipate having the general formula:

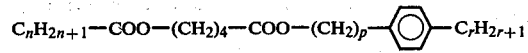

wherein n is greater than or equal to 1 and the sum of p+r is greater than or equal to 1; or
      (ii) a dialkyl adipate in which the alkyl group contains from 3 to 8 carbon atoms.

2. The plasticizer according to claim 1 wherein the diester is triethylene glycol di-n-heptanoate, triethylene glycol di-2-ethylhexanoate, or triethylene glycol di-n-octanoate.

3. The plasticizer according to claim 2 wherein the alkyl alkylaryl adipate is benzyl octyl adipate, benzyl hexyl adipate, benzyl butyl adipate or benzyl decyl adipate.

4. The plasticizer according to claim 1 comprising a mixture of triethylene glycol di-n-heptanoate with benzyl octyl adipate.

5. The plasticizer according to claim 1 comprising a mixture of triethylene glycol di-2-ethylhexanoate with benzyl octyl adipate.

6. The plasticizer according to claim 1 comprising a mixture of triethylene glycol di-n-octanoate with benzyl octyl adipate.

7. A composition of matter comprising a polyvinyl butyral resin having a molecular weight between about 30,000 and 600,000, a 0 to 10% content by weight of residual ester groups, calculated as polyvinyl acetate and a 12 to 25% content by weight of hydroxyl groups, calculated as polyvinyl alcohol, plasticized with a plasticizer mixture of:
   (a) between about 10 and 90% of at least one triethylene glycol diester of a monocarboxylic acid wherein the carbon chain comprises 7 or 8 carbon atoms; and (b) between about 90 and 10% of at least one adipate which is:
(i) an alkyl alkylaryl adipate having the general formula:

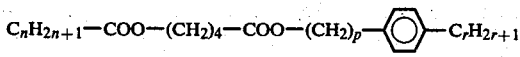

wherein n is greater than or equal to 1 and the sum of p+r is greater than or equal to 1; or
(ii) a dialkyl adipate in which the alkyl group contains from 3 to 8 carbon atoms.

8. The composition of matter according to claim 7 wherein the plasticizer content of the polyvinyl butyral-plasticizer mixture is between about 10 and 65%.

9. An interlayer for laminated safety glass comprising the composition of matter according to one of claims 7 or 8.

10. A laminated safety glass comprising two sheets of glass having between the glass surfaces an interlayer of polyvinyl butyral having a molecular weight between about 30,000 and 600,000, a 0 to 10% content by weight of residual ester groups, calculated as polyvinyl acetate and a 12 to 25% content by weight of hydroxyl groups, calculated as polyvinyl alcohol, plasticized with a plasticizer mixture of:
(a) between about 10 and 90% of at least one triethylene glycol diester of a monocarboxylic acid wherein the carbon chain comprises 7 or 8 carbon atoms; and
(b) between about 90 and 10% of at least one adipate which is:
(i) an alkyl alkylaryl adipate having the general formula;

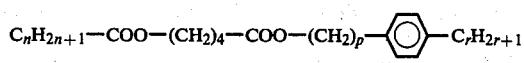

wherein n is greater than or equal to 1 and the sum of p+r is greater than or equal to 1; or
(ii) a dialkyl adipate in which the alkyl group contains from 3 to 8 carbon atoms.

11. The laminated safety glass according to claim 10, wherein the diester is triethylene glycol di-n-heptanoate, triethylene glycol di-2-ethylhexanoate or triethylene glycol di-n-octanoate.

12. The laminated safety glass according to claim 11, wherein the alkyl alkylaryl adipate is benzyl octyl adipate, benzyl hexyl adipate, benzyl butyl adipate, or benzyl decyl adipate.

13. The laminated safety glass according to claim 10, comprising a mixture of triethylene glycol di-n-heptanoate with benzyl octyl adipate.

14. The laminated safety glass according to claim 10, comprising a mixture of triethylene glycol di-2-ethylhexanoate with benzyl octyl adipate.

15. The laminated safety glass according to claim 10, comprising a mixture of triethylene glycol di-n-octanoate with benzyl octyl adipate.

16. The composition of matter according to claim 7 wherein the diester is triethylene glycol di-n-heptanoate, triethylene glycol di-2-ethylhexanoate, or triethylene glycol di-n-octanoate.

17. The composition of matter according to claim 16 wherein the alkyl alkylaryl adipate is benzyl octyl adipate, benzyl hexyl adipate, benzyl butyl adipate or benzyl decyl adipate.

18. A method for plasticizing polyvinyl butyral having a molecular weight between about 30,000 and 600,000, a 0 to 10% content by weight of residual ester groups, calculated as polyvinyl acetate and a 12 to 25% content by weight of hydroxyl groups, calculated as polyvinyl alcohol, which comprises admixing the polyvinyl butyral with a plasticizer mixture of:
(a) between about 10 and 90% of at least one triethylene glycol diester of a monocarboxylic acid wherein the carbon chain comprises 7 or 8 carbon atoms; and
(b) between about 90 and 10% of at least one adipate which is:
(i) an alkyl alkylaryl adipate having the general formula:

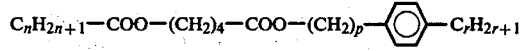

wherein n is greater than or equal to 1 and the sum of p+r is greater than or equal to 1; or
(ii) a dialkyl adipate in which the alkyl group contains from 3 to 8 carbon atoms.

19. The method according to claim 18 wherein the diester is triethylene glycol di-n-heptanoate, triethylene glycol di-2-ethylhexanoate, or triethylene glycol di-n-octanoate.

20. The method according to claim 19 wherein the alkyl alkylaryl adipate is benzyl octyl adipate, benzyl hexyl adipate, benzyl butyl adipate or benzyl decyl adipate.

* * * * *